Feb. 15, 1944. K. KOWEINDL 2,341,628
WORK BENCH FOR WELDING JOBS AND THE LIKE
Filed Oct. 12, 1940

INVENTOR
KARL KOWEINDL
PER Karl A. Mayr
ATTORNEY

Patented Feb. 15, 1944

2,341,628

UNITED STATES PATENT OFFICE 2,341,628

WORKBENCH FOR WELDING JOBS AND THE LIKE

Karl Koweindl, Vienna, Germany; vested in the Alien Property Custodian

Application October 12, 1940, Serial No. 360,856
In Germany December 1, 1939

2 Claims. (Cl. 98—115)

This invention relates to means for removing the gases and vapors which are produced during welding with electrodes or in autogenous welding, which are detrimental to the workman and impair the visibility. In order to reduce or remove these gases and vapors, a suction bonnet has been arranged heretofore above the working table to draw off the gases and vapors. In this manner the accumulation of great quantities of gas and vapor could be prevented, but the detrimental effect of the gases and vapors could not be eliminated entirely because the gases and vapors flowing upwardly pass along the eyes and the respiratory organs of the workman.

By the means provided according to the present invention the detrimental effect of the gases and vapors produced during welding is eliminated wholly. This is achieved by providing the working plate of a work bench with openings through which the gases and vapors are drawn off in a downward direction. Preferably, the working plate consists of perforated sheet metal through whose openings the gases evolved during welding are drawn off, and through which openings the dripping particles can drop.

Figure 1:
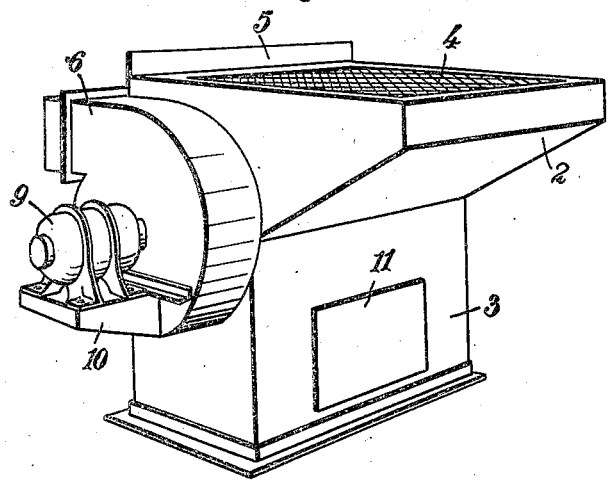
Figure 2:
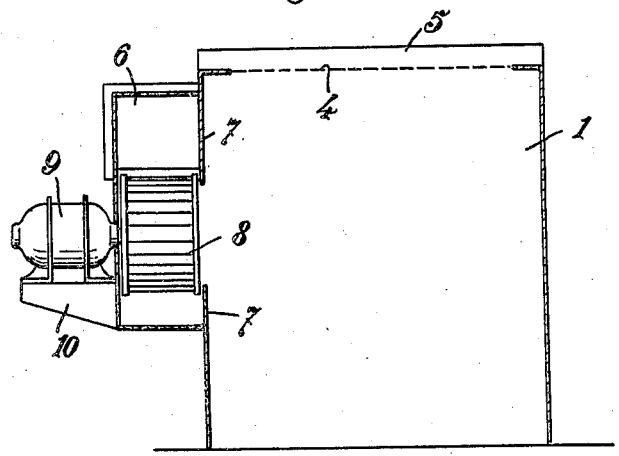

An example of a work bench according to the invention is represented in the drawing wherein Figure 1 is a perspective view and Figure 2 is a longitudinal section.

The work bench comprises a closed suction chamber 1 of generally rectangular form including a downwardly and rearwardly angulated wall 2 which joins the upper end of the front wall of the smaller lower rectangular base part 3. The upper end of the suction chamber is covered by a plane perforated sheet metal plate 4 constituting the working plate of the work bench. Preferably on the rear edge of the working plate a backboard 5 is arranged. On one side wall 7 of the suction chamber a suction blower 6 and blower housing are mounted on the upper part of the casing in such a manner that the side wall 7 of the suction chamber also constitutes the side wall of the blower 6. The rotor 8 of the suction blower is driven by the motor 9 arranged on the bracket 10. The intake side of the rotor 8 communicates directly with the chamber 1 through the opening 12 in the wall 7. By a short waste gas conduit 13 the blower is connected with the open air. Preferably the base part 3 of the suction chamber is provided in its front wall with an opening 11 which can be closed and through which the lower part of the suction chamber is accessible. The upper part 2 of the suction chamber 1 is constructed in such a manner that the working plate 4 projects forwardly from the front wall of the base part 3 of the suction chamber.

When welding operations are performed on a work bench according to the invention the gases and vapors produced are drawn off the weld and pass downwardly away from the work and away from the face of the welder and through the openings of the perforated working plate, into the suction chamber 1, and are removed therefrom into the open air by the blower 6. As a consequence, the gases and vapors evolved during welding are prevented from impairing visibility of the work and from having any detrimental effect upon the respiratory organs of the workman, so that the capacity for work of the workman is raised materially with the work bench according to the invention. This is particularly the case where hollow electrodes are used, which produce great quantities of gases and vapors, and also where heavily greased parts are welded.

The particles dripping during welding will drop into the suction chamber 1 through the openings of the perforated working plate and can be removed from the bottom of the suction chamber from time to time through the opening 11.

What I claim, is:

1. A work bench for welding operations comprising a closed box-like suction casing comprising a lower section and an upper section, said upper section being enlarged at its upper end so as to project forwardly with respect to the front part of the lower section, the said upper end of the casing being substantially horizontal and being closed by a perforated plate serving as a working plate, the upper part of the sidewall of the suction casing being formed with a suction opening, and a suction blower housing mounted on the upper part of the said side of the suction casing around said suction opening, said suction blower housing enclosing a suction rotor registered with said suction opening to directly produce suction in said suction casing so as to draw gases and vapors from a welding operation on the working plate downwardly through the perforations of the working plate and into the casing, said blower housing having a discharge conduit through which the withdrawn gases and vapors are discharged from the blower housing.

2. A work bench according to claim 1 wherein the inner wall of said blower housing is constituted by the said sidewall of the suction casing, the blower housing being integrally connected to said sidewall.

KARL KOWEINDL.